United States Patent

Gueldenpfennig et al.

[15] 3,707,140

[45] Dec. 26, 1972

[54] TELEPHONE SWITCHING NETWORK SIGNALLING SYSTEM

[72] Inventors: Klaus Gueldenpfennig, Penfield; Uwe A. Pommerening; Stanley L. Russell, both of Webster, all of N.Y.

[73] Assignee: Stromberg-Carlson Corporation, Rochester, N.Y.

[22] Filed: Nov. 25, 1970

[21] Appl. No.: 92,588

[52] U.S. Cl. ............. 179/18 J, 179/18 FC, 179/43 R

[51] Int. Cl. .............................................. H04q 11/04

[58] Field of Search ................................ 179/18 J, 43

[56] References Cited

UNITED STATES PATENTS

| | | | |
|---|---|---|---|
| 3,223,784 | 12/1965 | Inose | 179/18 J |
| 3,258,539 | 6/1966 | Mansuetto | 179/18 J |
| 3,261,923 | 7/1966 | Anderson et al | 179/18 J |
| 3,458,658 | 7/1969 | Aro | 179/18 J |
| 3,458,659 | 7/1969 | Sternung | 179/18 J |
| 3,592,970 | 7/1971 | Cappetti | 179/18 J |

*Primary Examiner*—Harold I. Pitts
*Attorney*—Charles C. Krawczyk

[57] ABSTRACT

A signalling system is provided for signalling through a network of switching matrices. A time division circuit provides periodic signals to the switching matrices for path finding purposes and transmits other signals through completed paths during the periods between path finding signals.

19 Claims, 10 Drawing Figures

Fig I

KLAUS GUELDENPFENNIG
UWE A. POMMERENING
STANLEY L. RUSSELL
INVENTORS

BY [signature]
ATTORNEY

KLAUS GUELDENPFENNIG
UWE A. POMMERENING
STANLEY L. RUSSELL
INVENTORS

BY

ATTORNEY

KLAUS GUELDENPFENNIG
UWE A. POMMERENING
STANLEY L. RUSSELL
*INVENTORS*

BY
Charles C. Krawczyk
ATTORNEY

KLAUS GUELDENPFENNIG
UWE A. POMMERENING
STANLEY L. RUSSELL
*INVENTORS*

BY

Charles C. Krawczyk
ATTORNEY

KLAUS GUELDENPFENNIG
UWE A. POMMERENING
STANLEY L. RUSSELL
INVENTORS

BY
Charles C. Krawczyk
ATTORNEY

KLAUS GUELDENPFENNIG
UWE A. POMMERENING
STANLEY L. RUSSELL
INVENTORS

BY
Charles C. Kraenzle
ATTORNEY

KLAUS GUELDENPFENNIG
UWE A. POMMERENING
STANLEY L. RUSSELL
*INVENTORS*

BY [signature]
ATTORNEY

KLAUS GUELDENPFENNIG
UWE A. POMMERENING
STANLEY L. RUSSELL
INVENTORS

BY
Charles C. Krawczyk
ATTORNEY

KLAUS GUELDENPFENNIG
UWE A. POMMERENING
STANLEY L. RUSSELL
INVENTORS

BY Charles C. Krawczyk
ATTORNEY

KLAUS GUELDENPFENNIG
UWE A. POMMERENING
STANLEY L. RUSSELL
*INVENTORS*

BY
Charles C. Krawczyk
ATTORNEY

TELEPHONE SWITCHING NETWORK SIGNALLING SYSTEM

BACKGROUND OF THE INVENTION

The present invention relates to telephone systems in general, and more particularly to a system for transmitting supervisory signals through a matrix switching network.

This invention is especially suitable for use in telephone exchanges having automatic switching systems for establishing connections through matrix switching networks and using the completed connections for the transmission of supervisory signals, control signals and the like. A number of different systems have been used in the prior art for transmitting supervisory type signals between circuits connected to opposite ends of a telephone matrix switching network. For example, signalling between circuits is accomplished in the prior art by the use of a common buss that parallels the network along with a complex time division multiplex arrangement for transmitting the supervisory signal along the common buss. Other systems of the prior art have used portions of the network to transmit the supervisory signals, such as for example, the voice path and/or the mark relays by transmitting high level DC signals. The transmission of the high level DC signals through the transmission path, or through the mark relay connections, generally introduces distortion and interference with the transmitted voice signals. In addition, the noise spikes and other transient effects may be picked up that may interfere with the operation of the supervisory signal reception system, such that a noise pulse may erroneously be mistaken for a supervisory signal.

A system for transmitting low level signals over a talking path is disclosed in a U.S. Pat. No. 3,610,834, entitled "Low Level Duplex Signalling System For Telephone Networks", filed on Nov. 4, 1968, for Mr. Klaus Gueldenpfennig, Mr. Frank Churnetski, and Mr. Enrique Comas. The signalling system of the copending application provides an arrangement for transmitting low level signals over the voice transmission path so as to reduce interference with the voice path as well as voice distortion of the signals which are being transmitted over the same or parallel path. Although the arrangement provides a system for transmitting low level signals with minimum interference and distortion, there are times at which it is necessary to transmit high level DC energizing potential (such as battery potential) along the transmission path and wherein the system of the copending application would not readily apply.

Other arrangements of the prior art include contacts in the switching network to provide a separate connection for each path through the network that is dedicated to the transmission of supervisory signals. With arrangements of this sort, low level signals can be transmitted over the dedicated connections that would provide minimum distortion and interference of other signals. However, such an arrangement is undesirably, expensive, since an added contact is necessary for each crosspoint that must be interconnected to form the additional path for signalling purposes.

It is, therefore, an object of this invention to provide a new and improved system for transmitting signals through a matrix switching network.

It is also an object of this invention to provide a new and improved signalling system for transmitting low level signals through a matrix switching network.

It is also an object of this invention to provide a new and improved signalling system for transmitting low level signals through a matrix network and still allow for high level battery transmission.

It is still a further object of this invention to provide a new and improved system for transmitting signals through a switching network without dedicating a separate path for signalling only.

BRIEF DESCRIPTION OF THE INVENTION

In a copending patent application, Ser. No. 92,593, entitled "Path Finding System For A Multiple Stage Switching Network" filed on Nov. 25, 1970, for Mr. Klaus Gueldenpfennig and Mr. Stanley L. Russell, various path finding systems are disclosed. In a first embodiment, separate switch means are provided for the crosspoint devices in a multistage matrix network that are rendered conductive while the corresponding crosspoint device is actuated to complete a path through the network. The switch means are interconnected by links to adjacent stages to provide a plurality of path finding signal paths corresponding to the paths including the crosspoint device. Circuit means monitor the link interconnections for the presence of a path finding signal to determine the busy-free condition of the paths. In a second embodiment, the hold or sleeve circuit of a relay crosspoint circuit is used for path finding. Circuit means monitor the sleeve link interconnection for the presence and/or absence of a potential to determine the busy-free condition of the sleeve links.

In accordance with a first embodiment of the present invention, the path finding signal paths through the network are also used for transmitting a plurality of signals between interconnected circuits at opposite ends of the network on a time division basis. Signalling means are connected to the switching means in the end stages of the network to periodically and simultaneously apply the path finding signal thereto and for transmitting a plurality of time divided sequential signals through completed path finding signal paths during periods between path finding signals.

In accordance with a second embodiment of the present invention, the sleeve links through the network are also used for transmitting a plurality of signals between interconnection circuits at opposite ends of the network on a time division basis during the periods between path finding cycles.

DESCRIPTION OF THE PREFERRED EMBODIMENT

Figure 1:
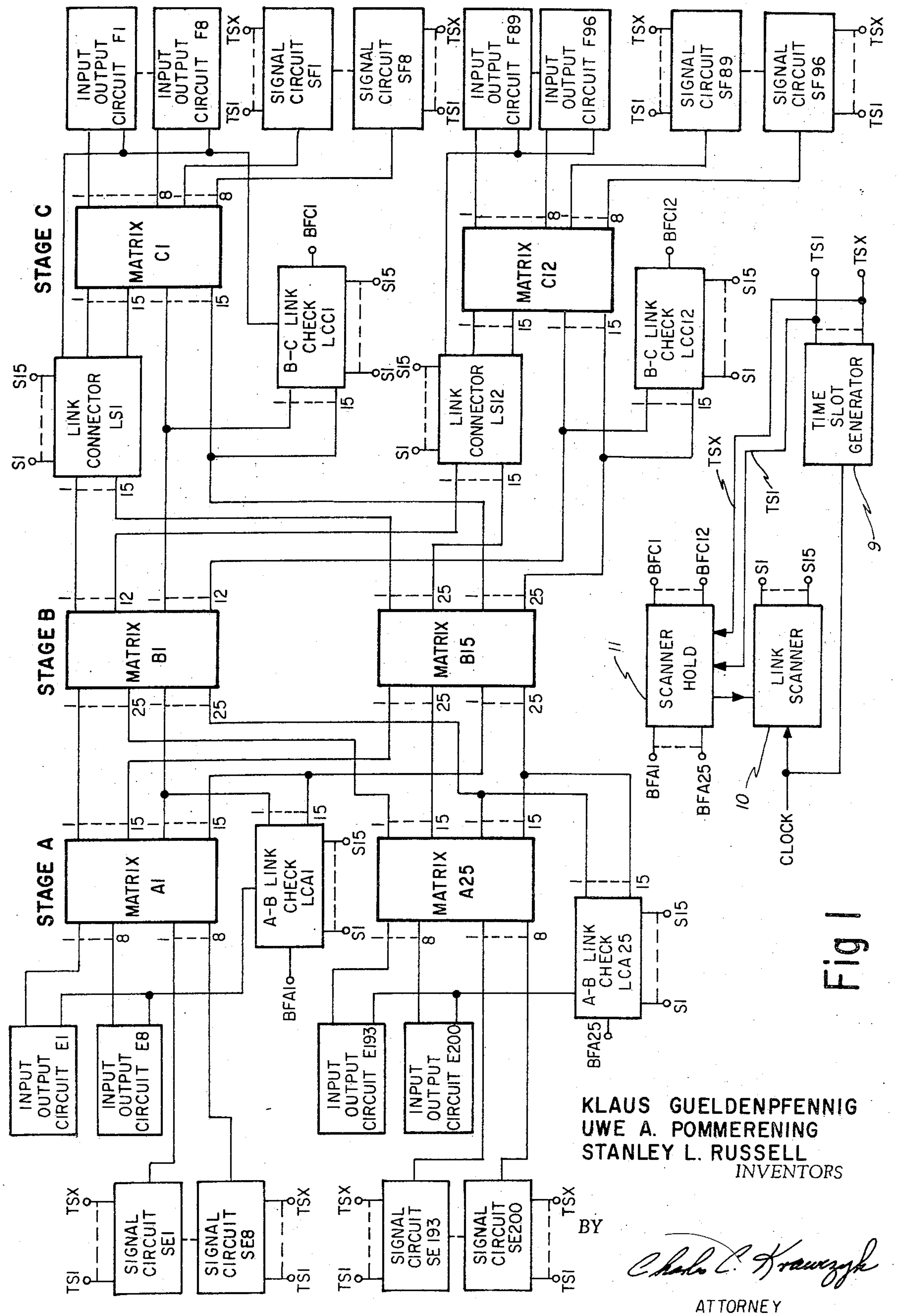
FIG. 1 is a simplified block diagram of a matrix switching network including the signalling system of the invention.

The signalling system of the invention is described in FIG. 1 in connection with a path finding system for a three stage (A, B and C) full availability matrix switching network. However, it is to be understood that the signalling system of the invention can be used with a large variety of matrix switching networks. Each stage includes a plurality of matrix groups which are interconnected so as to provide, in the network depicted herein for purposes of illustration, fifteen possible connections between any of the input-output circuits at one end of the network and any of the input-output circuits at the other end of the network. For purposes of illustration, 200 input-output circuits (E1 through E200) are connected to the stage A and 96 input-output circuits (F1 through F96) connected to the stage C. The stage A includes 25 matrix groups (A1 through A25) with eight separate input-output circuits connected to each matrix group. The stage B includes 15 matrix groups (B1 through B15). The stage C includes 12 matrix groups (C1 through C12) with eight input-output circuits connected to each matrix group.

The matrix groups in stages A, B and C are interconnected by signal links or link interconnections (illustrated as the upper group of lines extending into and from the various matrix groups) in an arrangement wherein any one of the input-output circuits connected to the stage A (E1 through E200) can be interconnected via the network by any one of fifteen paths to any of the input-output circuits (F1 through F96) connected to the stage C. For further information on the interconnection of matrices in the manner described above is available in article entitled "A Study of Non-Blocking Switching Network" by C. Clos, which appeared in the "Bell System Technical Journal", Volume 32, March 1953, pages 406–424.

If the switching network is to form a part of a telephone switching system, the input-output circuits E1 through E200 can correspond to line circuits, or service circuits, while the input-output circuits F1 through F96 can correspond to junctor or trunk circuits. Further, it should be understood that the three stage matrix illustrated in FIG. 1 is merely exemplary and that other arrangements of switching matrices having a different number of matrix groups in each stage and having a greater number of matrix stages can also be used with the signalling system of the invention.

In accordance with a first embodiment of the invention, the signalling system of the invention provides periodic signals for path finding and allows for the transmission of time divided multiplex signals through completed paths between the path finding signals. A separate one of a plurality of signalling circuits SE1 through SE200 is provided for each of the input-output circuits E1 through E200 and are connected to corresponding ones of the stage A matrix modules. Likewise, a separate one of a plurality of signalling circuits SF1 through SF96 is provided for each of the input-output circuits F1 through F96 and are connected to corresponding ones of the stage C matrix modules. The signalling circuit SE1 through SE200 and SF1 through SF96 form a physical portion of their respective input-output circuits. However, for purposes of simplifying the description of the invention, the signalling circuits have been illustrated as separate blocks. The signalling circuits SE1 through SE200 and SF1 through SF96 provide the time division signalling system wherein: (1) a periodic ground signal is simultaneously applied to all the stage A And C matrix modules during the path finding sequence, and (2) a plurality of time divided signals can be transmitted through completed paths through the network during the period between path findings sequences, in a manner as described in a later portion of the specification.

The path finding system includes a plurality of link connector circuits (LS1 through LS12) that are connected in series with the link interconnections between the stage B and stage C matrix groups. A separate link connector circuit is provided for each of the stage C matrix groups C1 through C12. The link connectors include a separate switch means in series with individual ones of the link interconnections. The separate switch means, when actuated, function to complete a connection through the network. A second group of link interconnections (designated link check interconnections) are made between the stage A and stage B matrix groups, and also between the stage B and stage C matrix groups, for path finding purposes and for signalling through the network in accordance with the invention. The link check interconnections are illustrated as the lower group of connection to each of the matrix groups, and are interconnected between the various matrix groups and stages in the same manner as the usual link interconnections. The link check interconnections during the path finding sequence provide a signal indicating the busy-free status of the corresponding link interconnections, and in between path finding sequences provide a signal path for transmitting time divided supervisory and control signals.

A separate link check circuit (LCA1 through LCA25) is provided for each of the matrix groups A1 through A25. The link check circuits LCA1 through LCA25 are coupled to the link check interconnections for path finding purposes to monitor the busy-free status of the fifteen link interconnections to stage A matrix groups A1 through A25. In addition, a separate link check circuit (LCC1 through LCC12) is provided for each of the stage C matrix groups (C1 through C12). The link check circuits LCC1 through LCC12 are coupled to the link check interconnections for path finding purposes to monitor the busy-free status of the fifteen link interconnections to the stage C matrix groups C1 through C12.

In accordance with the invention, a time division multiplex system is provided that allots a given time period for each path finding cycle. The time period is more than sufficient to complete the connections through the network. A first portion of the time period is for path finding purposes and the completion of a connection through the network and the remainder of the period is used to sequentially transmit a plurality of supervisory and/or control signals over the completed link check interconnections. A time slot generator circuit 9 controls the time period allotted for the path finding cycle and divides the time period into the time slots TS1 through TSX. The time slot generator circuit 9 is connected to apply the first time slot TS1 to enable a scanner hold circuit 11 during this period for path finding purposes and also applies the last time slot TSX to reset the scanner hold circuit for the next path finding sequence. The time slot TS2 is allotted for allowing the various switching devices to pick up when a free path has been found and completed. The outputs TS1 through TSX of the time slot generator circuit 9 are also connected to the signal circuits SE1 through SE200 and SF1 through SF96 so that the signal circuits simultaneously apply a path finding signal to the link check interconnections via completed connections in their connected matrices during time slot TS1 and so that time divided signals can be transmitted through completed link check interconnection during the time slots TS3 through TSX. Hence, according to the invention, the link check interconnections periodically function as a part of a path finding circuit and also function as a signalling circuit during periods between path finding sequences.

Each of the link check circuits are connected to be enabled by the input-output circuits connected to corresponding matrix groups. For example, the link check circuit LCA1 is enabled by a request for service from any of the input-output circuits E1 through E8 connected to the matrix group A1. Likewise, the link check circuit LCC1 is enabled by a request for service from any of the input-output circuits F1 through F8 connected to the matrix group C1. In addition, the link connectors LS1 through LS12 are also connected to be enabled by the input-output circuits connected to corresponding stage C matrix groups. For example, when the link check circuit LCC1 is enabled, the line connector LS1 will also be enabled. Hence, as can be seen that when the input-output circuits on opposite ends of the network are marked for connection, the corresponding link check circuits and a link connector are automatically enabled.

The link check circuits LCA1 through LCA25, the link check circuits LCC1 through LCC12, and the link connector circuits LS1 through LS12 are adapted to receive sequential scanning pulses from the common link scanner circuit 10 via terminals S1 through S15. With 15 link interconnections available for each of the matrix groups in the stages A and C, 15 sequentially timed pulses are applied to the terminals designated S1 through S15 for scanning through the selected groups of link check interconnections to determine the busy-free status of corresponding link interconnections. For example, if input-output E1 is to be connected to the input-output circuit F1, the link check circuits LCA1 and LCC1 and the link connector circuit LS1 are enabled. There are fifteen possible connections between the input-output circuits A1 and C1, with each path going through a different stage B matrix group. When the link check and link connector circuits are enabled, the scanning pulses applied to the link check circuits allow the enabled link check circuits to sequentially monitor the busy-free condition of the link interconnections comprising each of the available fifteen paths and to allow the link connector circuit to simultaneously select the link interconnection between the stages B and C as the corresponding link check interconnections are being monitored. The link connector circuits LS1 through LS12, when enabled, scan along in synchronism with the link check circuits to sequentially drive connector switches that are connected to complete the paths through the links between the selected matrix modules in stages B and C, however, the repetition rate of scanning pulses from the link scanner circuit 10 is sufficiently high that the connection switches do not respond to the scanning pulses.

The link check circuits LCA1 through LCA25, when enabled, scan the various link check interconnections and produce corresponding busy-free signals at the terminals BFA1 through BFA25, respectively. The link check circuits LCC1 through LCC12, when enabled, scan the various link check interconnections and produce corresponding busy-free signals at the terminals BFC1 through BFC12, respectively. The busy-free signals occur in synchronism between corresponding BF terminals due to the use of a common link scanner 10 for all the link check circuits. If a simultaneous free signal appears in corresponding A–B and B–C link interconnections, a free path through the network has been found. The busy-free terminals BFA1 through BFA25 and BFC1 through BFC12 are connected to a scanner hold circuit 11 that detects a simultaneous occurrence of a free signal from the A–B and B–C link check circuits. When a simultaneous free signal is presesent at these terminals during the time slot TS1 allotted for the path finding sequence, the scanner hold circuit 11 applies a stop signal to the link scanner circuit for a sufficient period of time to allow the corresponding switch means in the link connector circuit and the crosspoint devices in the network to pick up and complete the connections through the network. The path finding sequence is completed within the time slot TS1 and the connection through the network is completed with the time slot TS2.

Figure 2:
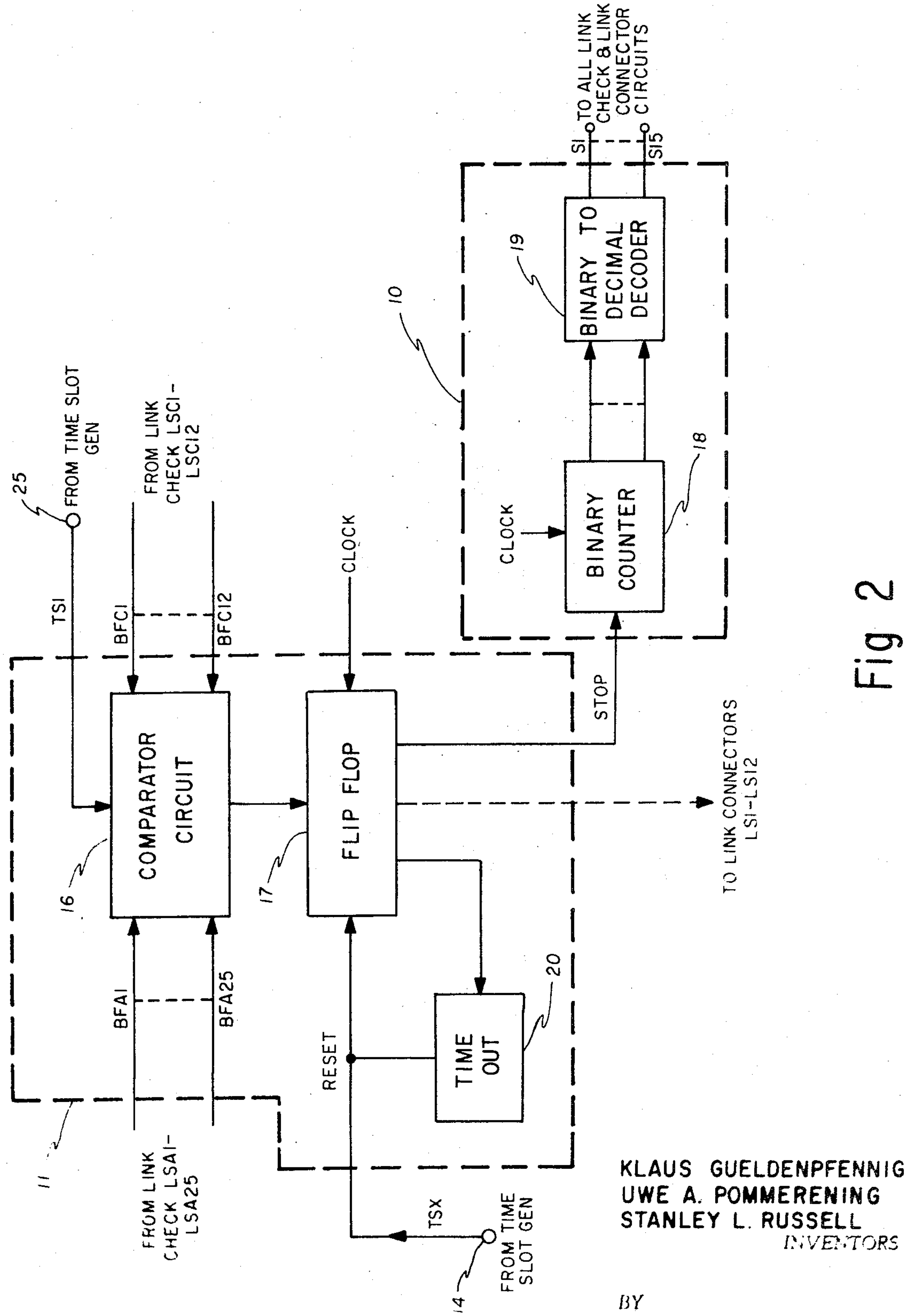
FIG. 2 is an expanded block diagram of the link scanner hold circuits of FIG. 1.

An embodiment of the link scanner 10 and the scanner hold 11 is illustrated in FIG. 2. The link scanner circuit 10 includes a binary-to-decimal decoder 19 receiving pulses from a clock driven binary counter 18 to develop the sequential scanning pulses at the terminals S1 through S15. It is to be understood, of course, that the link scanner circuit would include other means of providing the sequential scanning pulses, such as by connecting a shift register as a ring counter. The scanner hold circuit 11 includes a comparator circuit 16 connected to receive the busy-free signals BFA1 through BFA25 and BFC1 through BFC12. During time slot TS1, when a simultaneous free signal is present at the BFA and BFC circuits to the comparator circuit 16, the comparator circuit applies a stop signal to set a flip-flop 17 in synchronism to a clock pulse. A flip-flop circuit 17, when set, applies an inhibit signal to the binary counter 18 which stops the counter circuit and holds the output of the decoder 17 constant at a count corresponding to the free path. The link connector circuit is now enabled for a sufficient period of time to pick up the connector relay and cross-point devices to complete the connection through the network. A reset pulse is applied to the flip-flop 17 from the time slot generator 9 to reset the flip-flop at the end of the next time slot TSX, thereby enabling the scanner hold circuit 11 for another path finding sequence. A time out circuit 20 is also coupled to the reset terminal of the flip-flop 17 as a safeguard in the event the time slot generator 9 fails to remove the hold scan signal.

If the link connectors LS1 through LS12 include semiconductor switch devices that can respond to the rapid scanning pulses, the flip-flop circuit 17 can also be connected to each of the link scanners (as designated in phantom in FIG. 2) so that the link connectors are inhibited from responding to the scanning pulses until a free path has been found. The selected link connector circuit will then be enabled to complete the path after the flip-flop 17 is set.

Figure 3:
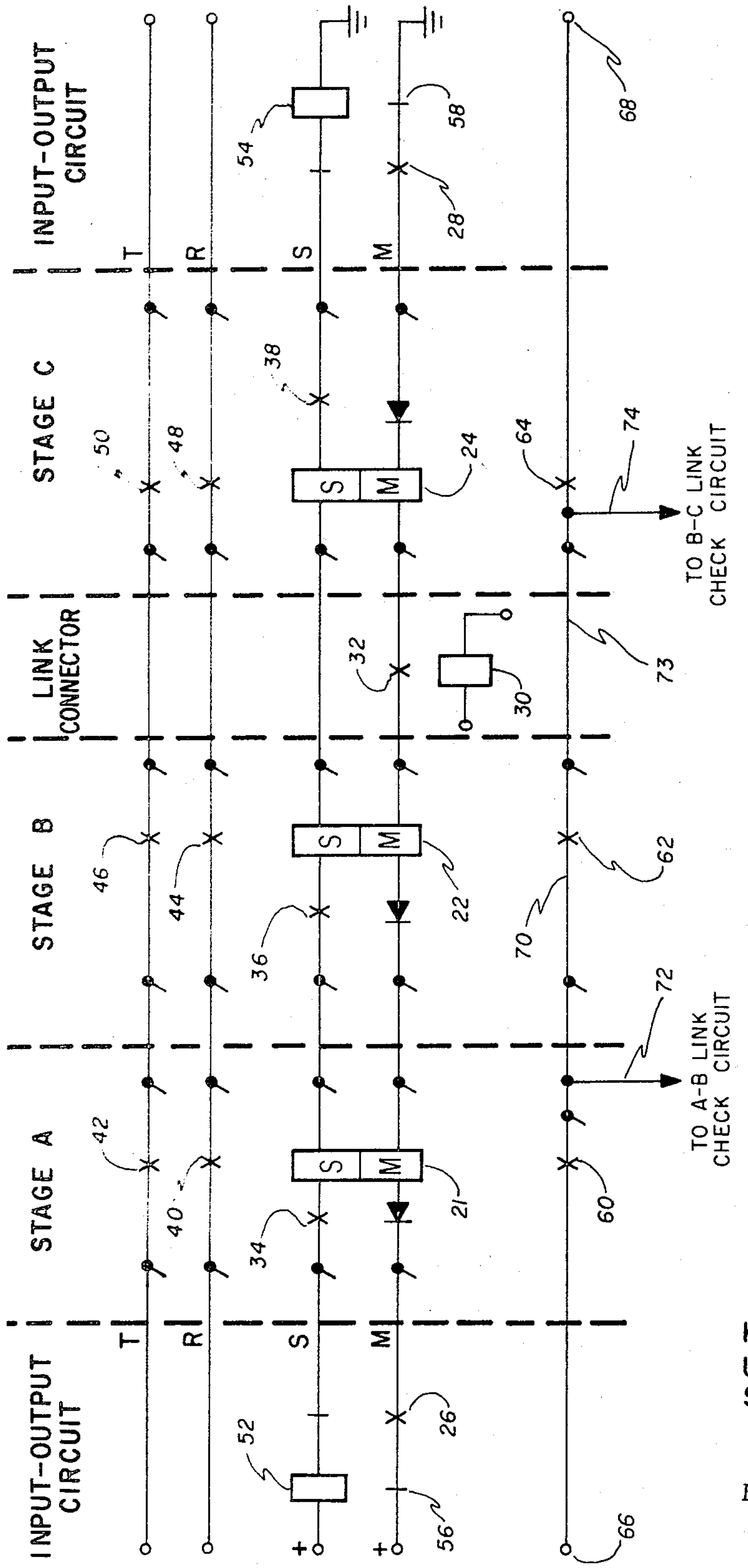
FIG. 3 is a schematic diagram illustrating the mark, sleeve, tip and ring circuits through one complete connection of FIG. 1, and, in addition, includes an added path finding signal path used in transmitting the path finding and other signals through the network in accordance with the invention.

FIG. 3 illustrates an embodiment of the mark, sleeve, tip and ring connection through a three stage relay switching matrix for use in telephone circuits and the like. For purposes of simplification, only one complete path through the network is illustrated. Each of the relays 21, 22 and 24 in the matrices in stages A, B and C include a mark or control coil M and a sleeve or a hold coil S. When a connection through the network is to be completed, mark contacts 26 and 28 in the input-output circuits on the opposite ends of the network are closed. Simultaneously, the corresponding two link check circuits and the corresponding link connector circuit are enabled to initiate the path finding procedure. The link connector circuits, for example, can include a separate relay 30 for each of the mark link interconnections between the stages B and C with contacts 32 of the connector relay 30 connected in series with the mark link. As previously mentioned, the link connector circuit receives scanning pulses at a rapid repetition rate so that the path through the network cannot be completed while scanning. In the case of the connector relay 30, the scanning rate will be sufficiently fast so that the relay cannot respond to the scan signal. If a semiconductor switch is to be used instead of the relay 30, the semiconductor device will be inhibited from responding to the scan pulses (as previously described) until after a free path is located.

When a free path through the network is located including the relays 21, 22 and 24 of FIG. 3, the enabled link connector circuit is stopped for a sufficient period of time to actuate the connector relay 30 and close the contacts 32. This completes the circuit for the mark relay coils and activates the relays 21, 22 and 24 closing contacts 34–50. The contacts 34, 36 and 38 complete the path through the sleeve coils of relays 21, 22 and 24 through the cut off relay coils 52 and 54 in the input-output circuits. When the relays 52 and 54 are activated, their contacts 56 and 58, respectively, open to disconnect opposite ends of the mark circuit. The connection through the network is now maintained by the sleeve coils of relays 21, 22 and 24. The tip (T) and ring (R) interconnections between the input and output circuits are completed via the contacts 40–50.

According to the first embodiment of the invention, each of the matrix relays 21, 22 and 24 have additional normally open contacts 60, 62 and 64 which function: (1) to provide an indication of the busy-free condition of the particular relay in the network during the path finding time slot TS1, and (2) form part of a completed path through the network providing an additional signal path during the time slots TS3 through TSX. The contacts 60, 62 and 64, when closed, form a connection between the terminals 66 and 68 at opposite ends of the network, which in turn, are connected to corresponding ones of the signalling circuits (SE1 through SE200 and SF1 through SF96, FIG. 1). The terminals 66 and 68 are grounded by the signalling circuits during the path finding sequence (TS1) and transmit signal pulses on a time division basis during the period between path finding sequences (TS3 through TSX) as is set forth in a later portion of the specification.

The series circuit including contacts 60, 62 and 64 form a link check interconnection circuit corresponding to the path through the network including relays 21, 22 and 24. The link check interconnection 70 between the contacts 60 and 62 is connected via line 72 to its corresponding A–B link check circuit while the link check interconnection 73 between contacts 62 and 64 is connected via line 74 to its corresponding B–C link check circuit. During the path finding sequence (TS1) the signalling circuits apply ground to terminals 66 and 68, and if the path corresponding to relays 21, 22 and 24 is free, the contacts 60, 62 and 64 will be open, therefore, no ground signal will be present at either of the lines 72 and 74 and the link check circuits will designate a free path. On the other hand, if either the relay 20 or the relay 24 is activated, or both, the corresponding contacts 60 or 64, or both, will be closed and the ground signal will be present at either line 72 or 74, or both, indicating a busy path. It is to be understood, of course, that other matrix relays are connected to the same link interconnections between the stages A and B and the stages B and C, and if another relay is actuated so as to connect one of the link interconnections of FIG. 3 in a path, the corresponding link check interconnections 70 or 73 will be grounded.

Figure 4A:
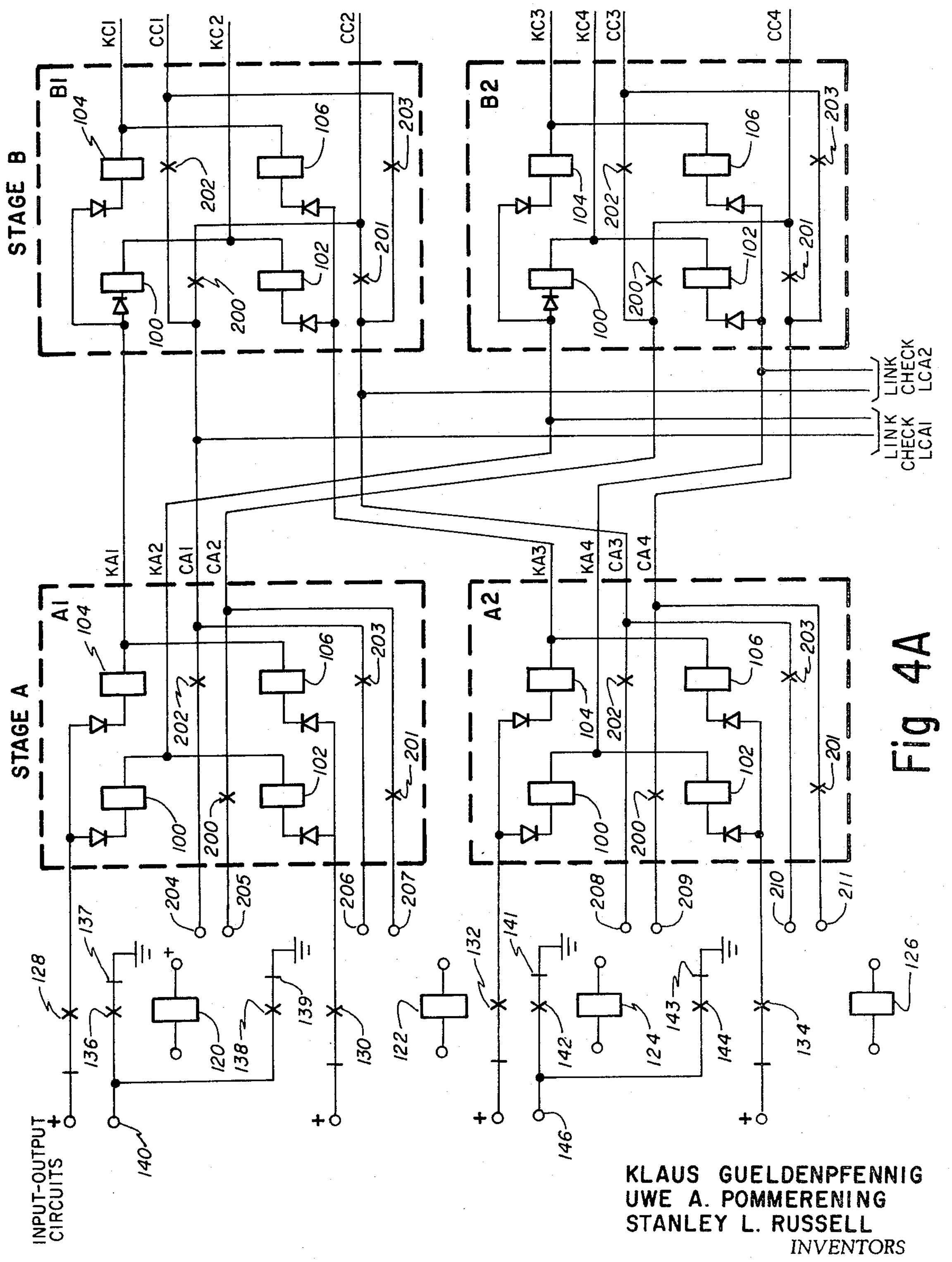
FIGS. 4A and 4B, in combination, include a schematic diagram of a first embodiment of a simplified three stage switching network of FIG. 1 illustrating the various signal link interconnections throughout the network used in transmitting the path finding and other signals through the network in accordance with the invention.
Figure 4B:
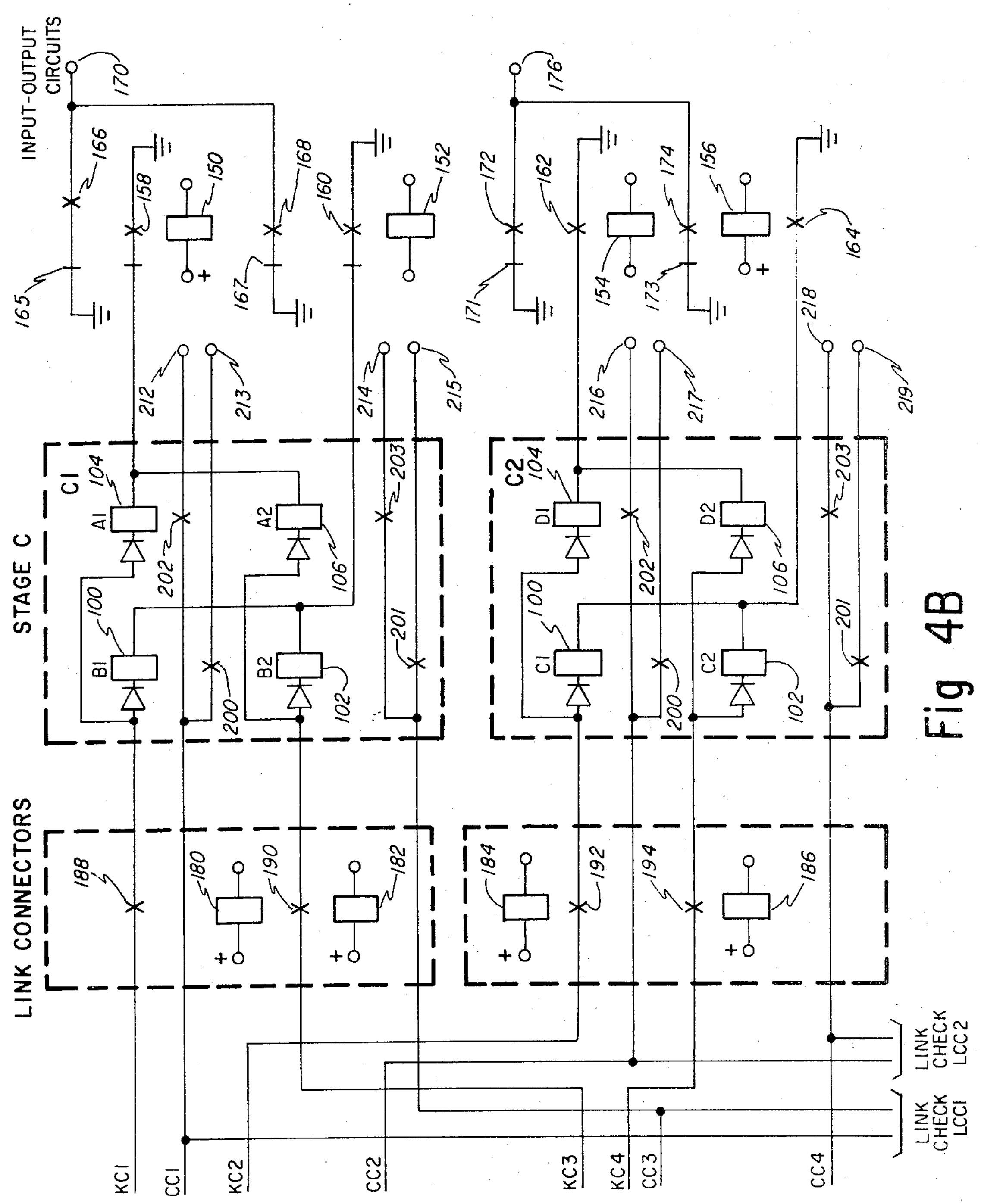

The switching network of FIG. 1 is illustrated in greater detail in FIGS. 4A and 4B, but simplified to only include two 2 P 2 matrix groups in each of the stages A, B and C and to only include the mark lead and link check interconnections. The sleeve and tip and ring interconnections in FIGS. 4A and 4B can correspond to that illustrated in FIG. 3. Each of the matrix groups depicted includes four relays 100–106. The matrix groups of FIGS. 4A and 4B are interconnected to provide two possible mark paths and two corresponding link check interconnection circuits between any input-output circuit connected to the stages A and C. The mark link interconnections between the stage A matrix groups and stage B matrix groups are designated KA1 through KA4. The link check interconnections between the matrix groups of stage A and stage B corresponding to the links KA1 through KA4 are designated CA1 through CA4. The mark lead link interconnections between the matrix group in stages B and C are marked KC1 through KC4. The link check interconnections between the matrix group in stages B and C corresponding to the mark lead connections KC1 through KC4 are designated CC1 through CC4. The input-output circuits connected to the stage A matrix groups include separate mark relays 120 through 126. The mark relay contacts 128 through 134, when closed, apply battery to its connected stage A matrix group. The normally open mark contacts 136 and 138 are connected to apply a ground signal via normally closed cut off relay contacts 137 and 139 to a terminal 140 that is connected to enable the link check circuit LCA1. Similarly, the normally open mark contacts 142 and 144 are connected to apply a ground signal via normally closed cut off relay contacts 141 and 143 to a terminal 146 that is connected to enable the link check circuit LCA2.

The input-output circuits connected to the C stage include mark relays 150 through 156. The mark relay contacts 158 through 164, when closed, apply a ground signal to its connected C stage matrix group. The normally open mark relay contacts 166 and 168 are connected to apply a ground signal via normally closed cut off relay contacts 165 and 167 to a terminal 170 connected to enable the link check circuit LCC1 and link connector LS1. Similarly, the normally open mark relay contacts 172 and 174 are connected to apply a ground signal via normally closed cut off relay contacts 171 and 173 to the terminal 176 that is connected to enable the link check circuit LCC2 and link connector LS2. A separate link connector relay 180 through 186 is provided for each of the links KC1 through KC4 with the normally open contacts 188 through 194 connected in series with its respective mark line.

In the embodiment of FIGS. 4A and 4B, each of the relays 100 through 106 in each of the matrix groups in stages A, B and C includes normally open link check and signalling contacts 200 through 203, respectively. One end of the contacts 200 through 203 in the matrix modules in stages A and C are connected via the terminals 204 through 219 to the corresponding signalling circuits (SE1 through SE200, and SF1 through SF96). The signalling circuits (SE1 through SE200, and SF1 through SF96) simultaneously apply ground to all of the terminals 204 through 219 during the path finding sequence (TS1). The other end of the link check contacts 200 through 203 are interconnected to form a matrix circuit through the stage B matrix groups so that when a connection through the network is completed, a link check path is completed by the link check contacts of the activated relays through the network designated CA1 through CA4 and CC1 through CC4.

For example, assume that the mark relays 120 and 156 in the input-output circuits at opposite ends of the network are activated to request an interconnection. Two paths are available, one through matrix group B1, and the other through matrix group B2. The contacts 136 apply ground via terminal 140 to enable the link check circuit LCA1. Similarly, the contact 174 applies ground via terminal 176 to enable the link check circuit LCC2 and also the link connector circuit LS2. During the path finding sequence (TS1), the signalling circuits apply ground to the terminals 204 through 219. The link check circuits LCA1 and LCC2 in unison check for ground at the link interconnections CA1 and CC1 corresponding to the path including links KA1 and KC2 and then subsequently check for a ground at a link interconnection CA2 and CC4 and corresponding to the path including links KA2 and KC4. At the same time that the link check circuits are scanning for a free path, the link connector circuit relays 184 and 186 are sequentially energized for a short period of time which is insufficient to close their contacts 192 and 194, respectively. Assuming that either of the links KA1, and KC2, or both, are busy, a ground will be applied to the link interconnections CA1, or CC2, or both, indicating that the path including links KA1 and KC2 is not available, therefore, the link scanner 10 (FIG. 1) will not stop, and the link connector contacts 192 will not close. Further, assuming that the links KA2 and KC4 are free, no ground will be present at the link interconnections CA2 and CC4 indicating a free path. Since the path including links KA2 and KC4 is free, the link scanner 10 is stopped and the link connector relay 186 is energized for a sufficient period of time to close the contacts 194. With mark contacts 128 and 164 closed, battery is applied to the matrix group A1 relays 100 and 102, and ground is applied to the matrix group C2 relays 100 and 102. Hence, when relay contacts 194 are closed, a path is completed via relay 100 in matrix group A1, relay 100 in matrix group B2 and relay 102 in matrix group C2. The path through the network is now completed as previously described with regards to FIG. 3. After the connection has been completed and between the path finding sequences, this link check interconnection through the network is used to transmit supervisory and control signals between the input-output circuits so connected.

Figure 5:
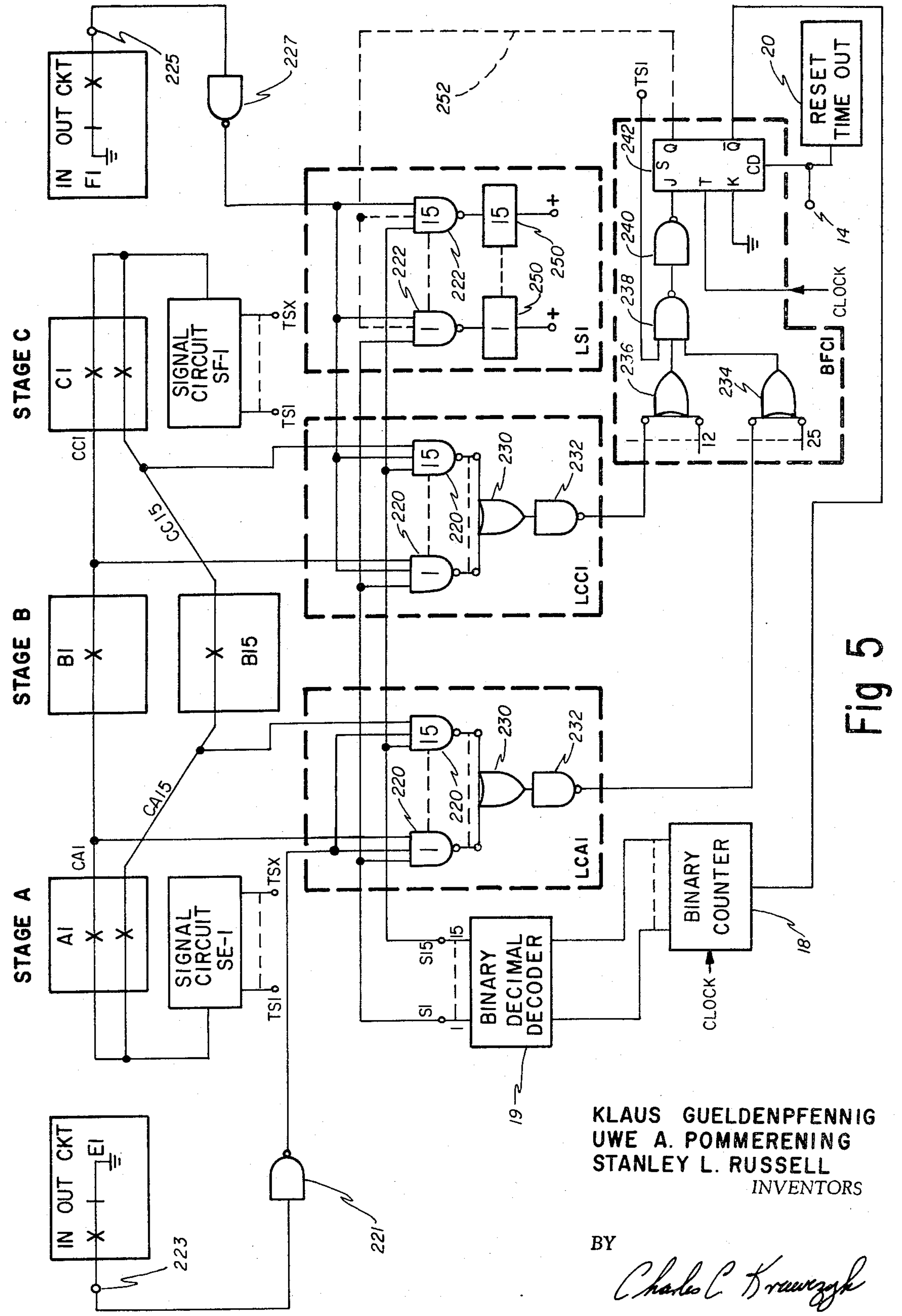
FIG. 5 is a logic diagram illustrating an embodiment of the link check circuits and link connector circuits of FIG. 1, and an embodiment of the comparator circuit of FIG. 2 interconnected in accordance with the path finding system employed in connection with the signalling system of the invention.

FIG. 5 illustrates an embodiment of the logic circuit for the link check circuits LCA1 through LCA25, and LCC1 through LCC12, and link connector circuits LS1 through LS12. For purposes of simplifying the illustration, only one matrix group in stages A and C is shown, and only two matrix groups in stage B are shown, indicating two possible link check interconnection paths between the input-output circuits E1 and F1. The contacts in the matrix groups A1, B1, B15 and C1 correspond to the link check contacts 60–64 of FIG. 3 and 200–203 of FIGS. 4A and 4B. The contacts in the matrix group A1 are connected to the signalling circuit SE1 for the input-output circuits E1 while the contacts in the matrix group C1 are connected to the signalling circuit SF1 for the input-output circuit F1. It is to be understood, of course, that with the 15 stage B matrix groups, 15 such paths are available. Furthermore, it is to be understood that the number of link check circuits and line connector circuits will correspond to the number of matrix groups in stages A and C. However, since only a single stage A matrix group and a single stage C matrix group is illustrated, only two matrix link check circuits LCA1 and LCC1 and one link connector circuit LS1 are included, and the other link check and link connector circuits will be identical to those illustrated in FIG. 5. The link check circuits LCA1 and LCC1 include 15 NAND gate circuits 220, one for each of the link check interconnections to the matrix groups A1 and C1. One input circuit of each of the NAND gates is connected to a separate one of the link check interconnections CA1 through CA15 in consecutive order with NAND gate No. 1 connected to CA1 and NAND gate No. 15 connected to CA15. In the same manner, gates of the link check circuit LCC1 are connected to the separate link check interconnections CC1 through CC15.

The line connector circuit LS1 includes 15 NAND gates 222, a separate one for each of the links KC1 through KC15. The outputs of each of the NAND gates is connected to drive a separate one of 15 link connector circuit relays 250. The contacts of the relays 250 are connected in series with different ones of the links KC1 through KC15.

Clock pulses are applied to the binary counter 18 at all times, except during stop scan. The output of the counter 18 is applied to the binary decimal decoder circuit 19 to provide 15 sequential time spaced scanning pulses at the terminals S1 through S15. The terminals S1 through S15 are connected to separate ones of the 15 NAND gates 220 in the link check circuits LCA1 through LCA25, and LCC1 through LCC12, and to the 15 NAND gates 222 in the link connector circuits LS1 through LS12, so that each of the 15 NAND gates in the link check and link connector circuits (corresponding to the same path through the network) are simultaneously and sequentially partially enabled in consecutive order. All the third input circuits of the groups of 15 NAND gates 220 in the link check circuits LCA1 are connected to receive an enable signal from any of the input-output circuits E1 through E8 via the terminal 223 and an inverter 221. The terminal 223 is connected to receive an ground signal from any of the input-output circuits E1 through E8 when requesting service in a manner (as illustrated in FIGS. 4A and 4B). All the third input circuits of the groups of 15 NAND gates 220 in the link check circuit LCC1 and all of the second input circuits of the groups of 15 NAND gates 222 in the link scan circuits LS1 are connected to receive an enable signal from any of the input-output circuits F1 through F8 via a terminal 225 and an inverter 227. The terminal 225 is connected to receive a ground signal from any of the input-output circuits F1 through F8 when requesting service (as illustrated in FIGS. 4A and 4B).

The arrangement is such that when a request for service is present in one of its input-output circuit groups, all the NAND gates in the corresponding link check circuits, and all the NAND gates in the corresponding link connector circuit are partially enabled. For example, all the NAND gates in the link check circuit LCA1 are partially enabled by a signal from the NAND gate 221 indicating that the input-output circuit requesting service is connected to matrix group A1. In the same manner, all the NAND gates in the link check circuit LCC1 and the link connector circuit LS1 are partially enabled by a signal from the NAND gate 227 indicating that the input-output circuit requesting service is connected to the C1 matrix group.

In operation, the NAND gates in the link check circuits LCA1 and LCC1 and link connector LS1 receive a first partial enable signal from their respective input-output circuits. The NAND gates in the link check circuit LCA1 and LCC1 and link connector LS1 also receive second partial enable scanning pulses from the binary decoder 19 that are sequentially applied to each group of NAND gates in consecutive order. Although both enabling signals are present at the link connector circuit LS1 as the selected link check circuit is scanned, the scanning rate which may be, for example, 250 kilohertz, is too rapid for the activation of the connector relays 250. The third enabling signal is applied to the NAND gates in the link check circuit LCA1 and LCC1 from the link check interconnections. Hence, the 15 NAND gates in the link check circuits are partially enabled by their input-output circuits and the scanning pulses from the circuit 19 to sequentially monitor individual pairs of link check interconnections (one interconnection between stages A and B and the other interconnection between stages B and C) in consecutive order and wherein the gates are fully enabled only when its connected link check circuit is not grounded.

The output circuits from the 15 NAND gates 222 in each of the link check circuits are connected to a NOR gate 230, which, in turn, is connected to inverter circuit 232. The output circuits of the inverter 232 from all the 25 A–B link check circuits (LCA1 through LCA25) are connected to separate inputs of a NOR gate 234. The output circuit of the NAND gate 232 from all 12 B–C link check circuits (LCC1 through LCC12) are connected to separate input circuits of a NOR gate 236. The outputs of the NOR gates 234 and 236 are connected to two inputs of a NAND gate 238. The other input circuit to the NAND gate 238 is connected to receive the time slot TS1 from the time slot generator. Hence, the NAND gate 238 can only be enabled when a free path is found during the time slot TS1. The output of the NAND gate 238 is connected through an inverter circuit 240 to the J input of a flip-flop 242. Clock pulses are applied to the T input of the flip-flop 242, while the K input is grounded. The $\overline{Q}$ output of the flip-flop circuit is connected to an inhibit circuit in the binary counter 18. The terminal 14 is connected to the time slot generator 9 to apply a reset signal to the CD input of the flip-flop 242 at the end of time slot TSX. A reset time out circuit 20 is also connected to the CD input of the flip-flop 242 to reset the flip-flop in the event that the flip-flop is not reset by time slot TSX.

In operation, when there is a request for connection, the NAND gates in one of the A–B link check circuits and in one of the B–C link check circuits and in a corresponding link connector circuit are enabled by their input-output circuits and during the time slots TS1, high speed switching pulses from the binary decimal decoder 19 scan the group of NAND gates of the selected link check circuits and link connector circuit in consecutive order. During time slot TS1, when a free link check interconnection is located, a signal pulse is applied from the link check circuit to its corresponding NOR gate 234 or 236. When simultaneous signals appear at the input of both the NOR gates 234 and 236, a free path through the network has been located. The simultaneous presence of enable signals at both of the inputs of the NAND gate 238 during the presence of the time slot TS1 applies a signal through the inverter 240 to "set" the flip-flop 242. The flip-flop 242, when "set", stops the binary counter 18. With the counter 18 stopped, the binary-decimal decoder 19 applies a continuous signal to one of the output leads S1 through S15 (corresponding to the links in the free path) which, in turn, enables the corresponding one of the 15 NAND gates 222 in the selected link connector circuit for a sufficient period of time to activate its connected link connector relay 250. As previously mentioned, the activated link connector relay closes a pair of contacts in the mark or control link in the network (such as contacts 188 through 194 in FIGS. 4A and 4B) and completes the free path between the two input-output circuits requesting service. After a period of time sufficient to complete the connections through the network and make the necessary metallic connection checks, the last time slot TSX resets the flip-flop 242 and restarts the counting cycle of the binary counter 18 for another path finding sequence.

If the link connector relays 250 are replaced by semiconductor switches, the Q output of the flip-flop circuit 242 can be connected (as illustrated by the line 252 in phantom in FIG. 5) to a third input circuit in each group of fifteen NAND gates 222 in the link connector circuits LS1 through LS12. The Q output of the flip-flop circuit 242 will inhibit the NAND gates 222 from responding to the scanning pulses from the binary counter 18 until a free path has been found and the flip-flop circuit 242 is set.

With the disclosed path finding system, the plurality of available links defining paths through the network are sequentially scanned in a manner so that the links and the crosspoints that define entire individual paths through the network are simultaneously monitored and a free path (if available) is located in the single path finding scan cycle. With the network illustrated in FIG. 1, a free path is detected in less than 100 microseconds from the time the input-output circuits on opposite ends of the network are marked. The time for actually completing the connection through the relay network of the type illustrated in FIGS. 3 and 5 is substantially longer than the path finding sequence. For example, added time is required to allow the link switching relay and the matrix relays to pick up. Further, in order to assure that a complete connection has been made, a check is also made on the metallic connections through the tip and ring contacts. Hence, a period of time, such as for example, 10 milliseconds (TS1 through TSX) is allotted to assure that a complete connection has been made.

According to the signalling system of the invention, a time division multiplex signal control system is provided for signalling through the network via the completed link check interconnections during the period when the link check interconnections are not used for path finding and setting up the connector (TS3 through TSX). As previously mentioned, a separate signalling circuit (SE1 through SE200, and SF1 through SF96) is provided for each of the input-output circuits (E1 through E200, and F1 through F96) connected to opposite ends of the network (FIG. 1). Each of the signalling circuits are essentially identical and include a transmitter section and a receiver section.

Figure 6:
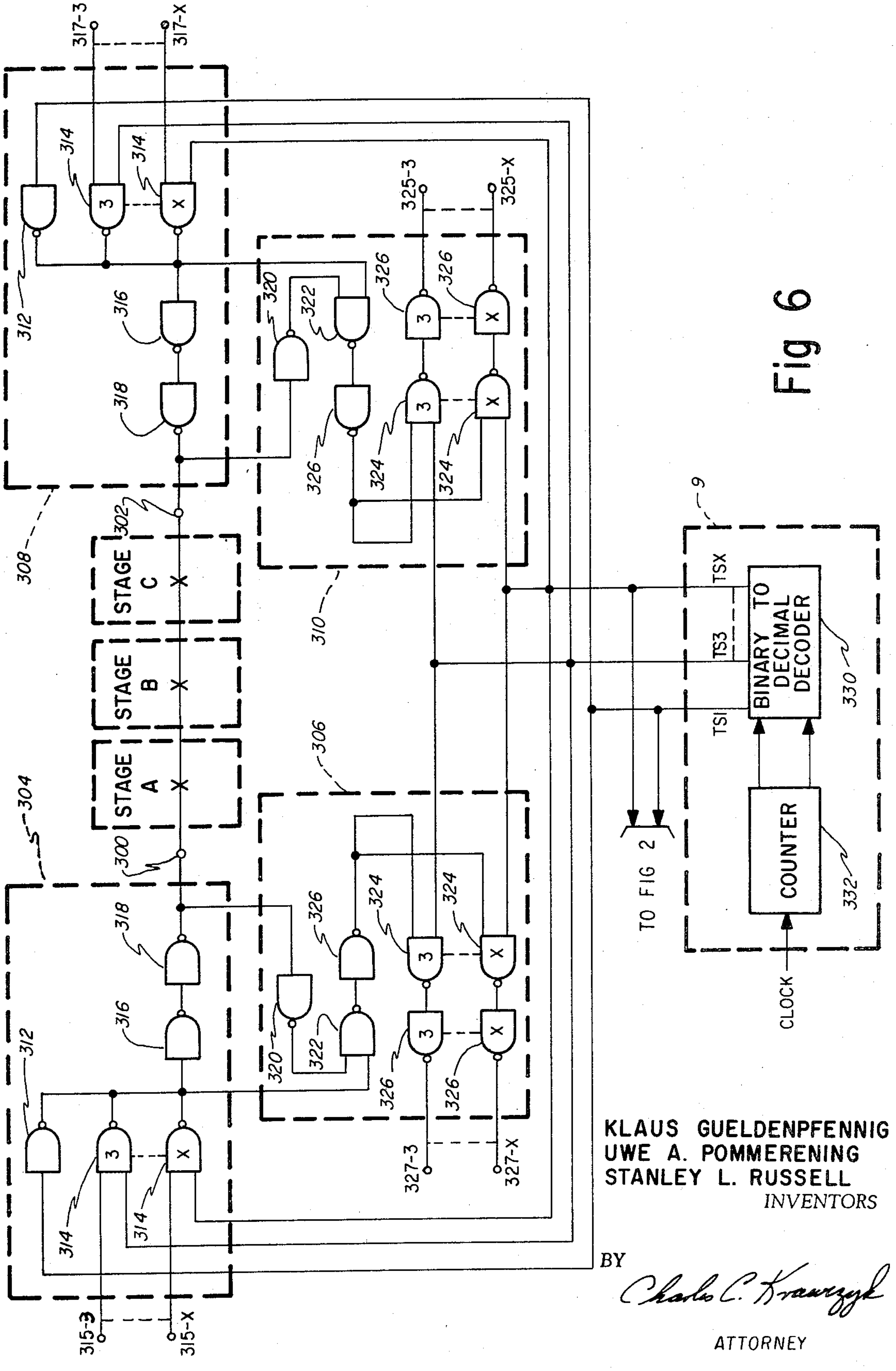
FIG. 6 includes a logic diagram illustrating an embodiment of the signalling circuits connected to opposite ends 3, the network of FIGS. 1, 3, 4, 5, 7 and 8 in accordance with the invention.

The signalling system of the invention is described with reference to FIG. 6 wherein two signalling circuits at opposite ends of the network (stage A and stage C) are interconnected via a single link check interconnection. The contacts in stages A, B and C correspond to the contacts 60, 62 and 64 of FIG. 3, and to the contacts 200 through 203 of FIG. 4. The terminals 300 and 302 correspond to terminals 66 and 68 in FIG. 3 and to the terminals 204 through 219 in FIGS. 4A and 4B. It should be understood, however, that a separate signalling circuit of the type illustrated in FIG. 6 is included in each of the signalling circuits SE1 through SE200 and SF1 through SF96.

The signalling circuit connected to the stage A matrix includes a transmitter section 304 and receiver section 306. The signalling circuit connected to the stage C matrix includes a transmitter section 308 and a receiver section 310. The transmitters 304 and 308 on opposite sides of the network are identical, and the receiver portions 306 and 310 are also identical. The transmitter sections 304 and 308 include a first NAND gate 312 connected to function as an inverter circuit. The NAND gate 312 is enabled only during the path finding sequence (TS1). The transmitter sections 304 and 308 also include a plurality of NAND gates 314, designated 3 through X according to the time slot during which the NAND gates 314 receive enabling pulses. The output circuits of the NAND gates 312 and 314 are connected via two cascade inverter circuits 316 and 318 to the link check interconnection terminals (300 or 302) at opposite ends of the network.

The receiver sections 306 and 310 include an inverter circuit 320 having its input connected to one link interconnection terminal (300 or 302) to receive signalling pulses transmitted through the network. The output of the inverter 320 is connected to one input of a NAND gate 322. The other input of the NAND gate 322 is connected to the outputs of the NAND gates 312 and 314 so that the NAND gates 312 and 314, when enabled, inhibit the NAND gate 322. Hence, the receiver portions 306 and 310 are inactivated when their corresponding transmitter portions 304 and 308, respectively, are transmitting. The output of the NAND gate 322 is connected via inverter 326 to the inputs of a plurality of NAND gates 324 designated 3 through X in accordance to their enabling time slots. Individual output circuits of the NAND gates 324 (3 through X) are connected to separate receive terminals (325 or 327) via inverter circuits 326 (3 through X).

The timing for the time division multiplex signalling system of the invention is provided by the time slot generator 9 which includes a binary-to-decimal decoder 330 connected to receive pulses from a clock driven counter circuit 332. The binary-to-decimal decoder 330 provides X sequential timing pulses (designated TS1 through TSX) within the period allotted for making connections through the network. For example, if the allotted period is 10 milliseconds, the period can be divided into 10 1 millisecond time slots. If a relay matrix is used as illustrated in FIGS. 3, 4A and 4B, time slot TS1 is allotted for path finding and the time slot TS2 is allotted for completing the network connections, while time slots TS3 through TS10 are allotted for signalling through the network. However, it should be understood that the time slot TS2 is available for signalling through previously completed circuits, if so desired. The time slot TSX output circuit is connected to terminal 14 in FIG. 2 to reset the flip-flop 17 and enable counter 18 for the next path finding sequence as previously described. The time slot TS1 output circuit is also connected to the NAND gates 312 in both the transmitter sections 304 and 308. The time slot output circuits TS3 through TSX are connected to separate ones of the NAND gates 314 and 324 (as indicated by the designation within the NAND gates) to apply sequential partial enable signals to individual ones of the NAND gates 314 and 324 in consecutive order.

During the time slot TS1, a high signal is applied to the inputs of the NAND gates 312 in both the transmitter sections 304 and 308, which, in turn, is transmitted through the inverters 316 and 318 as a ground signal at the terminals 300 and 302 for the path finding purposes as previously described. In the transmitter 304, the signals to be transmitted through the network are applied to the transmit terminals 315–3 through 315–X. In the transmitter 308, signals to be transmitted are applied to the transmit terminals 317–3 and 317–X. The arrangement is such that a ground signal is transmitted through the network (via the link check interconnections) if a high signal is applied to the transmit terminals (315 and 317) at the time a time slot signal is applied to the corresponding NAND gates 314. The high signal is reproduced at the other end of the network at the receive terminals 325–3 through 325–X, or 327–3 through 327–X.

When any of the NAND gates 312 or 314 are enabled, a ground signal is applied to the NAND gate 322 in the corresponding receiver section to disable the receiver while transmitting. The transmitter sections on opposite sides of the network are allotted different time slots so that only one transmitter section is operating in any given time. For example, the transmitter section 304 can be allotted odd time slots while the transmitter section 308 can be allotted the even time slots. In such an arrangement, only the transmit terminals 315 of the odd numbered NAND gates 314 in the transmitter 304 are connected to input circuits, and only the transmit terminals 317 of the even numbered NAND gates 314 of the transmitter 308 are connected to input circuits. Hence, as the NAND gates 314 are scanned by the time slots TS3 through TSX, only the odd numbered NAND gate 314 in the transmitter section 304 are capable of being enabled, and only the even numbered NAND gates 314 in the transmitter section 308 are capable of being enabled.

For example, assume a high signal is present at the transmit terminal 315–3 in the transmitter section 304. During time slot TS3, the NAND gate 314–3 is enabled and applies a ground signal to the inputs of the inverter 316 and the NAND gate 322. The ground on the NAND gate 322 inhibits the corresponding receiver section 306. The ground signal is transmitted through the inverters 316 and 318 and the network to the input of the NAND gate 320 in the receiver section 310. Since only the even numbered transmit terminals 317 are connected to receive high level input signals, the NAND gates 314 of the transmitter section 308 can only be enabled during even time slots. Hence, a high signal is present at one of the inputs of the NAND gate 322 during the odd time slot. Therefore, the ground at the terminal 302 at time slot TS3 is transmitted as a high level signal to the other input of the NAND gate 322, which, in turn, is enabled to apply a high level signal to all the NAND gates 324 via the inverter 326. The NAND gate 325–3 also receives time slot TS3 and is enabled to apply a ground to the inverter 328–3 to produce the high signal at the receive terminal 315–3 corresponding to the high at the transmit terminal 315–3. Hence, it can be seen that any high level signal applied to the odd numbered transmit terminals 315 in the transmitter section 304 will be reproduced at the odd numbered receive terminals 305 of the receiver section 310. In the same manner, any high level signal of the even numbered transmit terminals 317 at the transmitter section 308 will be reproduced at the even numbered receive terminals 327 of the receiver section 306.

Hence, it can be seen with the signalling system of the invention, a ground can be applied to the link check contacts and link check interconnection during the time slot TS1 allotted to the path finding sequence. Once a connection has been completed, the signalling system of the invention provides for transmitting signals through the network on a time division multiplex basis via the completed link check interconnections except for the periods allotted to path finding. The circuit of the invention provides for supervisory signalling through the network without the use of additional crosspoints that are dedicated to such signalling. The signalling system of the invention takes advantage of the existing link check contacts and link check interconnections during periods that are not used for path finding to provide an added function of through matrix signalling.

Figure 7A:
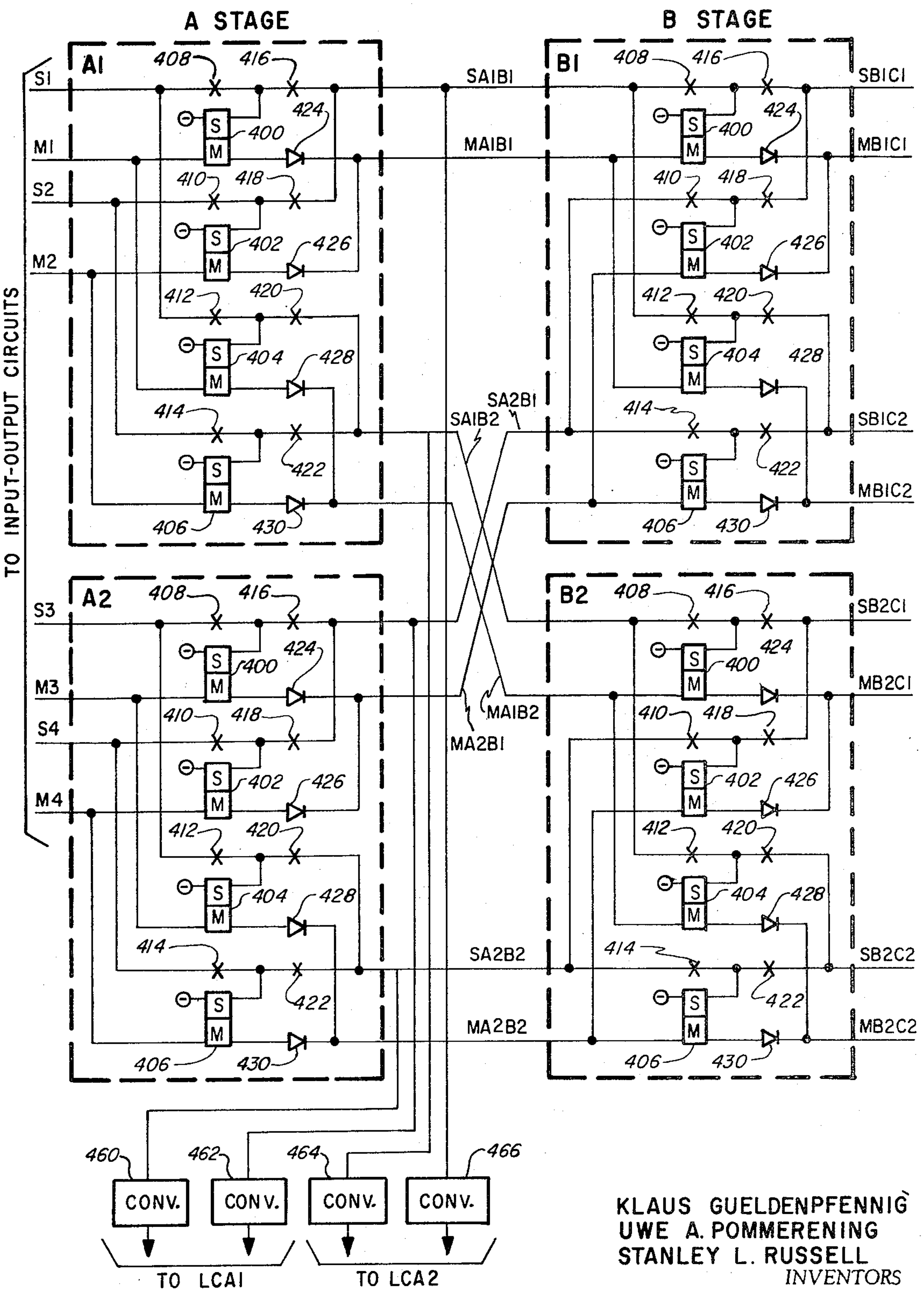
FIGS. 7A and 7B, in combination, include a schematic diagram of a second embodiment of a simplified three stage switching network, including parallel sleeve or hold circuits used in providing path finding signals and for through matrix signalling in accordance with the invention.
Figure 7B:
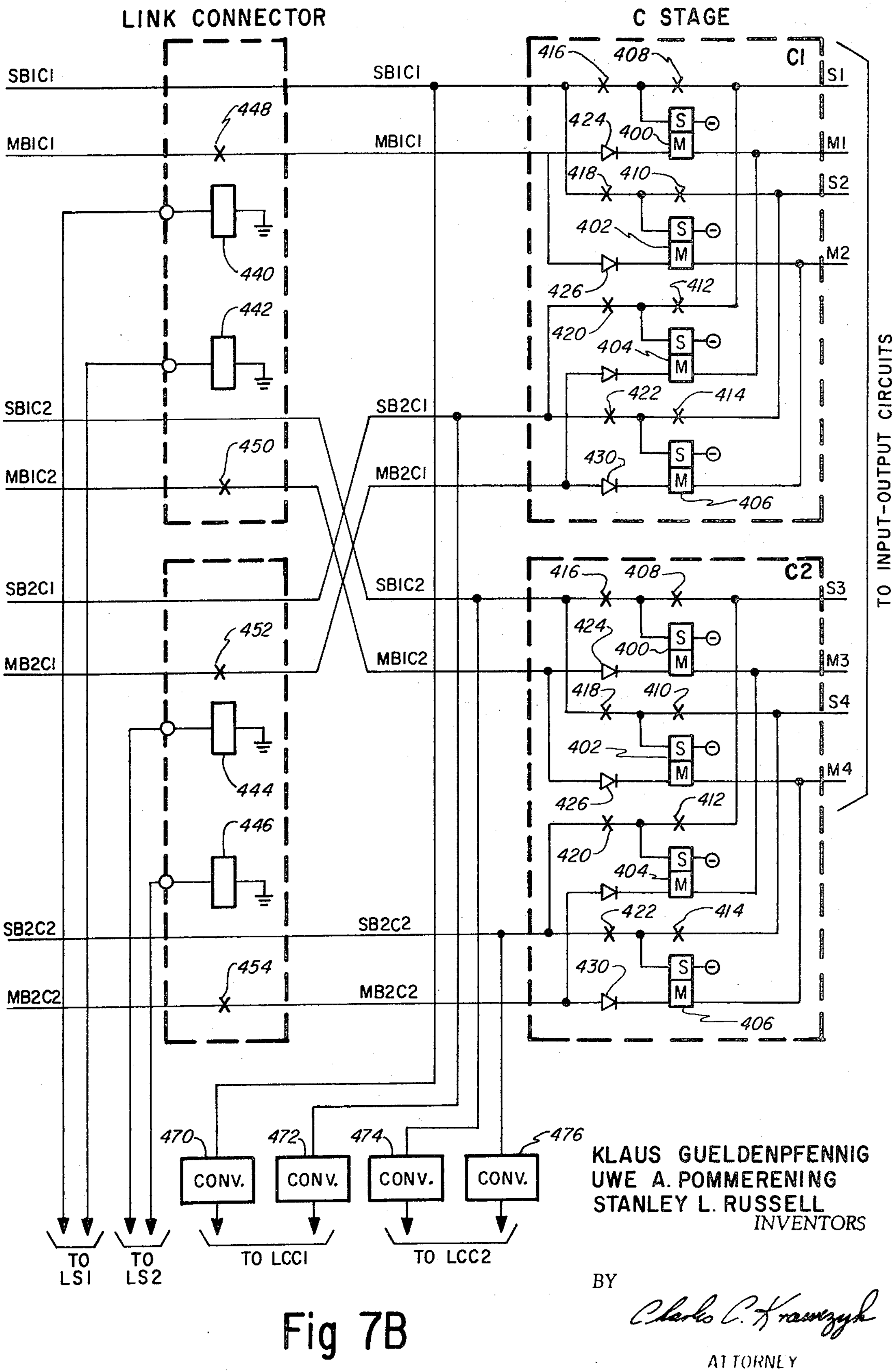
Figure 8:
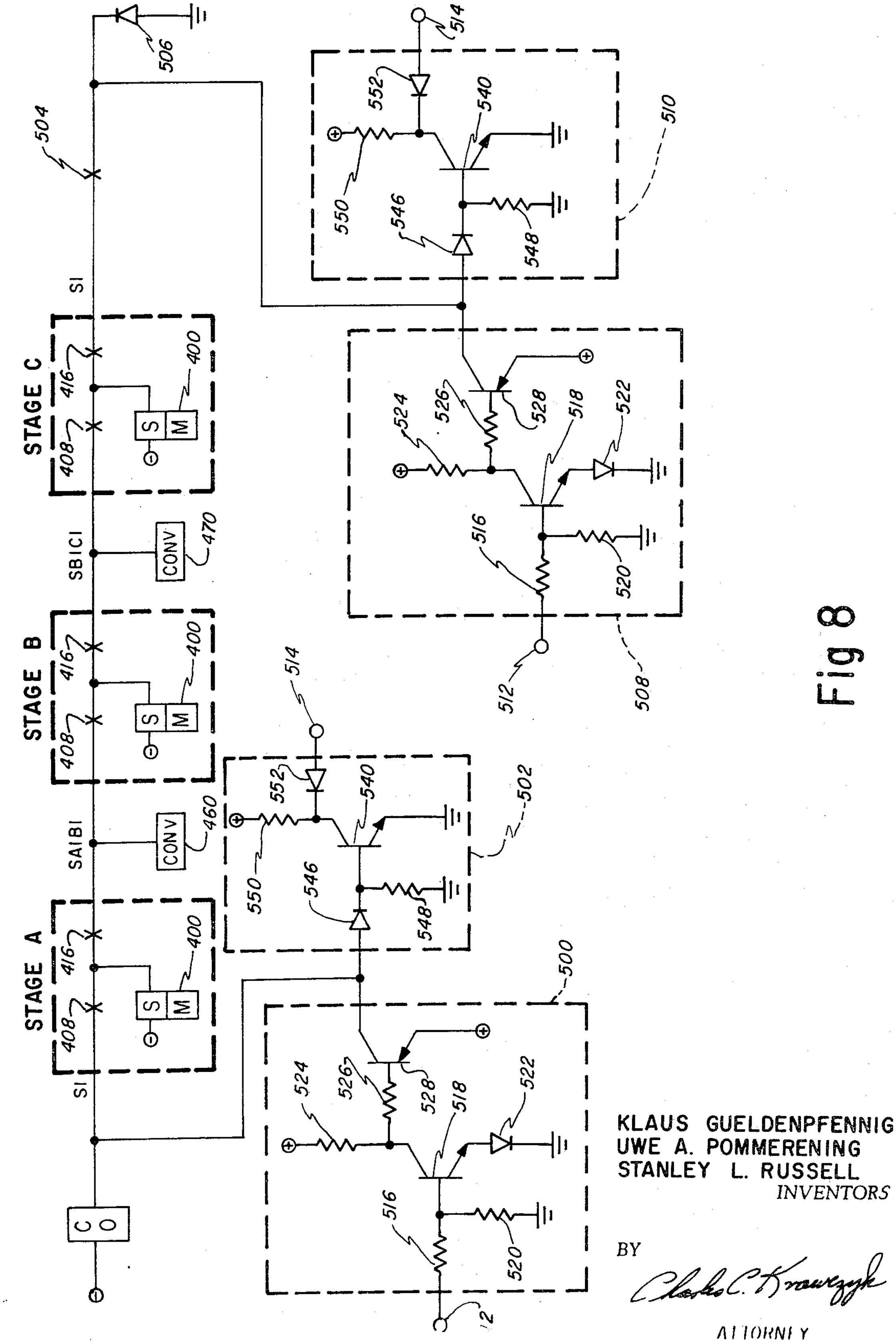
FIG. 8 includes a schematic diagram illustrating the interface circuits used to connect the logic circuitry of FIG. 6 for signalling through the sleeve lead interconnections of FIGS. 7A and 7B.

FIGS. 7A, 7B and 8 include a second embodiment of the signalling system of the invention that employs the sleeve circuits for path finding and time division multiplex signalling. The path finding system checks the busy-free condition of the sleeve link interconnections by determining which sleeve links are connected to form a part of a completed circuit and/or by detecting for the presence of a potential indicating the various sleeve links are busy. The switching network of FIGS. 7A and 7B is a three stage (A, B and C) network wherein each stage is divided into separate matrix groups. For purposes of simplifying the explanation of this embodiment of the invention, each stage is illustrated as having two matrix groups (A1 and A2, B1 and B2, C1 and C2). Each of the matrix groups in the simplified network includes four cross-point relays 400 through 406. However, it should be understood that the signalling system of the invention will function with a network with stages having any number of matrix groups and the matrix groups can have any of crosspoint relays. Each of the crosspoint relays includes a mark (lower) coil M and a hold or sleeve (upper) coil S. The arrangement is such that the relays are activated by energizing the mark coil M to actuate the relay, and wherein the contacts of the activated relay complete the circuit for the sleeve coil S. After the sleeve coil is energized, the circuit for the mark coil is opened and the connection is maintained by the sleeve coil.

The diodes 424 through 430 are connected in series with one end of the mark coils M of the relays 400 through 406, respectively. One end of mark coils in the stage A matrix is connected to the input-output circuits at one end of the network, while the end is connected to one end of the mark coils in the stage B matrix groups via the mark link interconnections MA1B1 through MA2B2 and the diodes 424 through 430. The other end of the mark coils M in the stage B matrix groups are connected to one end of the connections MB1C1 through MB2C2 and the diodes 424 through 430. The other end of the mark relay coils in stage C are connected to the input-output circuits at the other end of the network. One end (first) of the sleeve coils of the relays 400 through 406 is connected to a negative power supply terminal, while the other end (second) is connected between the junction of two if its make relay contacts (408 through 422). The second end of the sleeve coils of the relays in the stage A matrix groups is connected to the S leads through contacts 408 through 414 and is also connected to the second end of the sleeve coils in the stage B matrix groups via sleeve link interconnections SA1B1 through SA2B2, and stage A contacts 416 through 430 and stage B contacts 408 through 414, and also is connected to the second end of the sleeve coils in the stage C matrix groups via the sleeve link interconnections SB1C1 through SB2C2, and contacts 416 through 422 (stages B and C). The second end of the stage A sleeve coils are also connected to the S leads via the contacts 408 through 414. The arrangement of the network of FIGS. 7A and 7B is such that two paths (one through matrix group B1 and the other through matrix group B2) are shown, but according to FIG. 5, 15 are available between any input-output circuits connected to the stage A matrix groups and any of the input-output circuits connected to the stage C matrix groups.

A link connector circuit is connected between the stage B and C matrix groups including the connector relays 440 through 446, each having separate contacts 448 through 454 connected in series with individual ones of mark links MB1C1 through MB2C2, respectively. In addition, the sleeve links SA1B1 through SA2B2 are connected to the link check circuits LCA1 and LCA2 via the converter circuits 460 and 462, and 464 and 466, respectively. The sleeve links SB1C1 through SB2C2 are connected to the link check circuits LCC1 and LCC2 via converter circuits 470 and 472, and 474 and 476, respectively. The outputs of the converter circuits 460 and 462 are connected to separate ones of the NAND gates 220 (FIG. 5) of the link check circuit LCA1. The output of the converter circuits 464 and 466 are connected to separate ones of the NAND gates 220 of the link check circuit LCA2. The output of the converter circuits 470 and 472 are connected to separate ones of NAND gates 220 of the link check circuits LCC1. The converters 474 and 476 are connected to separate ones of the NAND gates 220 of the link check circuit LCC2. The converter circuits function to provide a signal (such as ground) when its connected sleeve link is busy.

The S leads (S1, S2, etc.) on opposite ends of the network are connected to the control and signalling circuits in the manner as illustrated in FIG. 8 to provide the circuit connections for completing the sleeve link circuits, and also to provide circuits for signalling through the sleeve link circuit in accordance with the invention. For purposes of simplifying the illustration, only one crosspoint relay 400 in each of the stages A, B and C has been illustrated with its contacts 408 and 416 connected to illustrate one complete sleeve link connection. However, it is to be understood that similar circuits are provided for each of the S leads in the stages A and C.

The S1 lead in the stage A matrix is connected to a cut off relay CO and also to a signal transmitting driver circuit 500 and a signal receiver circuit 502. The S1 lead in the stage C is connected by a release contact 504 to ground through a diode 506, and also to a signal transmitter driver circuit 508 and a signal receiver circuit 510. The transmitter and receiver driver circuits of FIG. 8 provide the interface interconnections and power circuitry required to connect the transmitter circuits 304 and 308, and the receiver circuits 306 and 310 of FIG. 6 to the sleeve lead circuit (S1) of FIG. 8. The arrangement is such that the output of the inverter circuit 318 of the transmitter circuits 304 and 308 of FIG. 6 are connected to the input terminals 512 of the transmitter driver circuits 500 and 508, respectively. The input circuits to the inverters 320 of the receiver circuits 306 and 310 are connected to the output terminals 514 of the receiver driver circuits 502 and 510, respectively.

The transmitter driver circuits 500 and 510 are identical. The input terminals of the transmitter drivers 512 are connected through a current limiting resistor 516 to the base of a transistor 518. The base of the transistor 518 is also connected to ground through a resistor 520. The emitter of the transistor 518 is connected to ground through a diode 522 while the collector is connected to a positive power supply terminal through a resistor 524. The collector of the transistor 518 is also connected through a current limiting resistor 526 to the base of a power switching transistor 528. The emitter of the transistor 528 is connected to a positive power supply terminal while the collector is directly connected to the S1 lead.

The receiver circuits 502 and 510 on opposite ends of the network are also identical. The S1 lead is connected to the base of a transistor 540 through a diode 546. The base is also connected to ground through a resistor 548. The emitter of the transistor 540 is connected to ground while the collector is connected to a power supply terminal through a resistor 550. The collector is also connected to the output terminal 514 via a diode 552.

Signalling through the sleeve lead is accomplished by applying a positive signal to the S1 lead at one end of the network and is receiving the positive pulse at the opposite end. Hence, when the inverter circuit 318 at one end of the network is enabled, the transistors 518 and 528 of the connected transmitter driver circuit are rendered conductive so that the transistor 528 essentially connects the positive power supply potential (in the order of −5 volts) at its emitter to the S1 lead. The receiver driver circuit at the other end of the network detects the presence of the positive signal wherein the transistor 540 is rendered conductive to apply a ground going signal to the output terminal 514.

The operation of the path finding system in the embodiment of FIGS. 7A, 7B and 8 will now be described. The mark leads at the opposite ends of the network are marked as previously described with regards to FIGS. 1, 3, 4A, 4B and 6. The marked input-output circuits apply a first partial enable signal to select: (1) the corresponding one of the stage A link check circuits; (2) the corresponding one of the stage C link check circuits, and (3) the corresponding one of the link connector circuits. The scanning pulses are applied to the selected link check circuits and the selected link connector circuit for sequentially enabling the NAND gates 220 and 222 (FIG. 5). In the network of FIGS. 7A and 7B, if a crosspoint relay is busy, the corresponding sleeve link will form a portion of a closed circuit and complete the input circuit of a converter circuit, which, in turn, will generate a busy (ground) signal. The path finding system scans the network during time slot TS1 until a pair of available sleeve links corresponding to a free path through the network is located, at which time, the scanning is stopped and the corresponding link connector relay is energized. After the crosspoint relays pick up, the contacts 504 (FIG. 8) are closed and the connection through the sleeve link contacts 408 and 416 is completed and the sleeve coils and relay CO are energized. The contacts of the relay CO open to drop out the mark coils.

Assume that mark leads M1 on opposite ends of the network are marked for connection, and assume further that the relay 402 in matrix group B is busy. The link check circuits LCA1 and LCC1 and the link connector circuit LS1 will be enabled. The circuit including the sleeve link SB1C1 will be completed and the converter circuit 470 will accordingly apply a busy signal to the NAND gate 220 in the link check circuit LCC1 indicating the busy condition in the first path (including relays 400 in matrix groups A1, B1 and C1) and the path finding scheme will then scan the other available path (relays 404 in matrix groups A1 and C1 and relay 400 in matrix group B2). If the relays 404 in matrix groups A1 and C1 are free, and the relay 400 in module B2 is free, sleeve links SA1B2 and SB2C1 are open circuited and the converter circuits 464 and 472 will therefore simultaneously apply a free signal to the respective link check circuits LCA1 and LCC1 indicating a free path has been found. The scanning will stop as previously set forth and the connector relay 442 will be energized to close contacts 450 and complete the connection through the matrix.

In accordance with the second embodiment of the invention, the inverter circuits 312 of FIG. 6 are eliminated and no signal is applied to the sleeve links during time slot TS1. The converter circuits 460 and 470 in this case will detect a low potential at the sleeve links (in the order of 1 0.7 volts) to produce the ground busy signal. During the time slots TS3 through TSX, the transmitter circuits 500 and 508 are enabled by the outputs of the inverter circuits 318 to transmit a positive signal level (approximately −5 volts) through the sleeve link circuit to a receiver driver (502 or 510) at the opposite end of the network, which, in turn, applies a ground signal to the inverter circuit 320 in its respective receiver circuit (306 or 310).

However, it is to be understood, that if desired, the inverter circuits 312 can be included. In such an arrangement, all the inverter circuits 312 in all the transmitter circuits 304 and 308 are simultaneously enabled during time slot TS1 to apply the positive signal (−5 volts) to the sleeve link and the converters 460 and 470 designed to detect the presence of the positive signal as a busy link. In addition, normally open contacts of a mark relay will be required to be connected in series with the relay CO to prevent the actuation of the relay during the path finding sequence by the path finding signals.

Hence, it can be seen by the above description of the invention, signals can be transmitted through the matrix on a time divided basis under an arrangement wherein paths through the network form a portion of a path finding arrangement during a first period (TS1), and during a subsequent period (TS3 through TSX) functions as a time division multiplex signalling path. The connection through the network can include a separate switch from each of the crosspoint devices in the network interconnected to provide an additional path through the network for path finding and signalling purposes, or a parallel sleeve coil circuit wherein the sleeve link circuits provide the signals for path finding purposes and also provide a low impedance path for signalling through the network. The signalling system of the invention provides a low impedance signalling path through the network (without the use of dedicated paths for signalling purposes only) and thereby allow low level signalling through the network and eliminating the problems that are inherent with high level signalling.

Although the present invention has been described with reference to two embodiments, it is to be understood that the scope of the invention is not limited to the specific details thereof, but is susceptible of numerous changes and modifications as would be apparent to one with normal skill in the pertinent technology.

What is claimed is:

1. A system for signalling through a network wherein the network includes a plurality of matrix stages, each including a plurality of switching devices connected as matrix switches, and wherein the matrix switches in the stages are interconnected to provide a plurality of control paths through the network for interconnecting circuits at opposite ends of the network, said signalling system comprising:

a plurality of switching means, a separate one for each of said switching devices in said plurality of stages, said switching means providing a conductive condition while the corresponding switching devices are actuated;

circuit means for interconnecting said plurality of switching means in adjacent stages to provide a plurality of signal paths through the network that correspond to the control paths including the switching devices;

path finding circuit means coupled to said circuit means connections to said plurality of switching means in at least one of said stages for detecting the presence of path finding signals indicating the path including the switching means is busy, and time division circuit means coupled to the plurality of switching means in the end stages of said network for periodically applying path finding signals thereto and for transmitting signals through completed signal paths during the periods between path finding signals.

2. A system for signalling through a network of switching matrices comprising:

a multistage network of switching matrices wherein each stage includes a plurality of switching devices and wherein the switching devices are interconnected between stages by link interconnections to provide plural paths between circuits connected to opposite ends of the network;

a plurality of switching means, a separate one for each of said switching devices in said plurality of stages, said switching means providing a conductive condition when the corresponding switching devices are actuated;

link interconnection circuit means for interconnecting the plurality of switching means in each of said stages to provide a plurality of signal paths through the network corresponding to the paths including the switching devices;

path finding means coupled to said circuit means, for detecting the presence of signals in the plurality of paths including switching means for identifying the paths that are completed, and signalling means coupled to the plurality of switching means on opposite sides of the network for periodically applying path finding signals thereto, and for transmitting signals through completed signal paths during the period between path finding signals.

3. A system as defined in claim 2 wherein:

said signalling means includes a plurality of signalling circuits connected to the switching means in the end stages on opposite ends of the network, wherein said signalling circuits include a receiver section, a transmitter section, and timing means for controlling the operation of the transmitter sections and receiver sections of the plurality of signalling circuits so that all transmitter sections simultaneously apply the periodic path finding signal to the plurality of switching means in the end stages and the transmitter and receiver sections receive enabling signals for applying signals to the switching means and receiving signals from the switching means during periods between path finding signals.

4. A signalling circuit as defined in claim 3 wherein:

said plurality of switching devices comprise relays, and said plurality of switching means comprise a set of make contacts of each of the relays.

5. A signalling circuit as defined in claim 3 wherein:

said transmitter section comprises a plurality of switching circuits, the output of which is connected to the switching means in the stages at opposite ends of the network;

said receiver section comprises a plurality of switching circuits, the input of which is connected to the switching means in the stages at opposite ends of said network, and said timing means simultaneously enables a selected switching circuit in each of the transmitters for applying path finding signals to the switching means and sequentially applies enabling signals to selected other ones of said transmitter and receiver switching circuits during the periods between path finding signals.

6. A signalling circuit as defined in claim 5 wherein:

said timing means includes a plurality of output circuits and provides consecutive timing pulses on each of the plurality of output circuits, and wherein selected ones of said output circuits are connected to separate ones of said transmitter switching circuits and wherein selected ones of said output circuits are connected to separate ones of said receiver switching circuits.

7. A signalling circuit as defined in claim 3 wherein:

said transmitter section is coupled to said receiver section in each of said signalling means to inhibit the receiver section when the transmitter section in the same signalling means is transmitting.

8. A system for signalling in a multistage matrix network wherein each stage includes a plurality of relays that are interconnected between stages by control links to provide a plurality of control paths between circuits connected to opposite ends of the network, and wherein at least one set of make contacts of each relay are interconnected by signal links to provide a plurality of corresponding signal paths, said system comprising:

a plurality of signalling circuits connected to the make contacts of the end stages on opposite ends of the network, wherein each signalling circuit includes a plurality of transmitter circuits, the outputs of which are connected to the make contacts, a plurality of receiving circuits, the inputs of which are connected to the make contacts, and circuit means coupled between said transmitter circuits and said receiver circuits in each signalling circuit for inhibiting receiver circuit while transmitting, and control circuit means coupled to said plurality of signalling circuits for periodically simultaneously enabling a transmitter circuit in all of the signalling circuits, and for sequentially enabling other transmitter and receiver circuits in the signalling circuits during the period between the simultaneous enabling of all the transmitter circuits.

9. A signalling system as defined in claim 8 wherein:

said transmitter circuits comprise a plurality of gating circuits responsive to be enabled by a signal from said circuit means to transmit a signal to the make contacts;

said receiver circuits comprise a plurality of gating circuits responsive to be enabled by a signal from said circuit means to accept a signal from the make contacts, and said control circuit means includes a plurality of output circuits and applies switching pulses to said output signals in sequence, and circuit means for coupling separate ones of said output circuits to said individual ones of said gating circuits in said transmitter to apply switching signals thereto, and circuit means for coupling separate ones of said output circuits to individual ones of said gating circuits in said receiver circuits to apply switch-ing signals thereto.

10. Apparatus for use with a switching network, where said network includes a plurality of matrix stages interconnected to provide plural control paths and plural holding paths between circuits connected to opposite ends of the network, wherein the matrix stages include a plurality of crosspoint relays arranged to form matrix switches, wherein each relay includes a hold winding connected in series with contacts of the relay and includes a control winding, with the control winding of each relay being connected in the control paths and the hold winding of each relay being connected in corresponding holding paths through the series relay contacts, said apparatus comprising:

path finding circuit means coupled to said holding path connections to at least one of said stages for detecting free holding path connections;

circuit means for periodically enabling said path finding circuit means for a preset period of time, and time division circuit means coupled to said holding paths in the end stages of said network for transmitting signals through completed holding paths during time periods while said path finding means is disabled.

11. Signalling apparatus as defined in claim 10 wherein:

said time division circuit means simultaneously applies a signal to all of said holding paths while path finding circuit means is enabled.

12. Apparatus for use with a network of switching matrices comprising:

a multistage network of switching matrices wherein each stage includes a plurality of crosspoint relays arranged to form matrix switches, wherein each relay includes a hold winding connected in series with contacts of the relay and includes a control winding, wherein control windings are interconnected between stages by control link interconnections to provide a plurality of control paths between circuits connected to opposite ends of the network and wherein the hold windings are interconnected between stages by holding link interconnections through the series contacts to provide a plurality of corresponding hold paths;

path finding circuit means coupled to the holding path link interconnections to at least one of said stages for determining the busy-free condition of holding path link interconnections;

control circuit means for periodically enabling said path finding means for a preset period of time, and signalling means coupled to the plurality of holding paths on opposite ends of the network for transmitting signals through completed holding paths during periods while said path finding circuit means is disabled.

13. A signalling system as defined in claim 12 wherein:

one end of the holding coil of each of said crosspoint relays is connected to a power source, while the other end is connected to one side of two pairs of make contacts of the same relay, and wherein the said pairs of make contacts are connected in series with the holding path link interconnections.

14. A signalling apparatus as defined in claim 13 wherein said signalling means includes:

a plurality of separate signalling circuits connected to individual ones of the holding paths at opposite ends of the network, wherein said signalling circuits include a receiver section and a transmitter section, and timing means for controlling the operation of the transmitter sections and receiver sections so that the transmitter and receiver sections receive enabling signals on a time divided multiplex basis for applying signals to the holding paths, and receiving signals from the holding paths, during periods said path finding circuit means is disabled.

15. Signalling apparatus as defined in claim 14 wherein:

each transmitter section comprises a plurality of switching circuits, the outputs of which are coupled to a separate holding path;

each receive section comprises a plurality of switching circuits, the input of which is coupled to a separate holding path, and said timing means sequentially applies enabling signals to selected ones of said transmitter and receiver switching circuits during the periods said path finding circuit means is disabled.

16. Signalling apparatus as defined in claim 15 wherein:

said timing means includes a plurality of output circuits and provides consecutive switching pulses on each of the plurality of output circuits, and wherein selected ones of said output circuits are connected to separate ones of said transmitter switching circuits, and wherein selected ones of said output circuits are connected to separate ones of said receiver switching circuits, the arrangement being such that a transmitter switching circuit and a corresponding receiver switching circuit at the opposite ends of the network receive simultaneous switching pulses.

17. Signalling apparatus as defined in claim 14 wherein:

said transmitter section is coupled to said receiver section and each of said signalling means to inhibit its receiver section while the transmitter section in the same signalling means transmits.

18. Signalling apparatus as defined in claim 13 wherein said signalling means includes:

a plurality of individual signalling circuits connected to separate holding paths in the end stages on opposite ends of the network, each signalling circuit includes a receiver section and a transmitter section, and timing means for controlling the operation of the transmitter sections and receiver sections of the plurality of signalling circuits so that all transmitter sections are simultaneously enabled to apply a periodic path finding signal to the plurality of holding path connections and the transmitter and receiver sections receive enabling signals for applying signals to the holding paths and receiving signals from the holding paths under a time division multiplex arrangement during periods said path finding circuit means is disabled.

19. Path finding and signalling system for a switching network comprising:

a multistage network of switching matrices wherein each stage includes a plurality of crosspoint relays arranged to form matrix switches, wherein each relay includes a hold winding connected in series with contact of the relay and includes a control winding, with the control winding of each relay being interconnected between stages by control link interconnections to provide a plurality of control paths between circuits connected to opposite ends of the network and with the hold winding of each relay being interconnected between stages by holding link interconnections through the series contacts to provide a plurality of hold paths corresponding to the control paths;

a plurality of make contacts, a separate one for each of said crosspoint relays in said network, said make contacts close when the corresponding crosspoint relays are actuated;

link interconnection circuit means for interconnecting the plurality of make contacts in each of said stages to provide a plurality of signal paths through the network corresponding to the control and hold paths;

path finding means coupled to said link interconnection circuit means periodically detecting the presence of signals in the plurality of signal paths to determine the busy-free condition thereof for completing free control, hold and signal paths between circuits connected to opposite ends of the network, and signalling means coupled to the plurality of make contacts on opposite sides of the network for periodically applying path finding signals thereto, and for transmitting signals through completed signal paths during the periods between path finding signals.

* * * * *

UNITED STATES PATENT OFFICE
CERTIFICATE OF CORRECTION

PATENT NO. : 3,707,140
DATED : December 26, 1972
INVENTOR(S) : Klaus Gueldenpfennig, et al.

It is certified that error appears in the above-identified patent and that said Letters Patent are hereby corrected as shown below:

| | |
|---|---|
| Col. 3, line 14 | "3," should read ---of---. |
| Col. 4, line 32 | "And" should read ---and---. |
| Col. 8, line 61 | "P" should read ---x---. |
| Col. 16, line 57 | After "any" insert ---number---. |
| Col. 18, line 61 | "-5" should read ---+5---. |
| Col. 19, line 54 | "10.7" should read --- -0.7 ---. |
| line 58 | "-5" should read ---+5---. |
| line 68 | "-5" should read ---+5---. |

Signed and Sealed this

*twenty-first* Day of *October 1975*

[SEAL]

*Attest:*

RUTH C. MASON
*Attesting Officer*

C. MARSHALL DANN
*Commissioner of Patents and Trademarks*